United States Patent
Seo et al.

(10) Patent No.: US 11,768,461 B2
(45) Date of Patent: Sep. 26, 2023

(54) MANUFACTURING METHOD OF HOLOGRAPHIC OPTICAL ELEMENT AND DISPLAY DEVICE INCLUDING HOLOGRAPHIC OPTICAL DEVICE MANUFACTURED THEREBY

(71) Applicant: LG CHEM, LTD., Seoul (KR)

(72) Inventors: Dae Han Seo, Daejeon (KR); Jae Jin Kim, Daejeon (KR); Min Soo Song, Daejeon (KR); Bu Gon Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 402 days.

(21) Appl. No.: 17/254,706

(22) PCT Filed: Sep. 10, 2019

(86) PCT No.: PCT/KR2019/011691
§ 371 (c)(1),
(2) Date: Dec. 21, 2020

(87) PCT Pub. No.: WO2020/055088
PCT Pub. Date: Mar. 19, 2020

(65) Prior Publication Data
US 2021/0116862 A1    Apr. 22, 2021

(30) Foreign Application Priority Data

Sep. 12, 2018   (KR) .................... 10-2018-0108650

(51) Int. Cl.
*G03H 1/04*    (2006.01)

(52) U.S. Cl.
CPC ... *G03H 1/0402* (2013.01); *G03H 2001/0415* (2013.01); *G03H 2001/0439* (2013.01); *G03H 2222/34* (2013.01)

(58) Field of Classification Search
None
See application file for complete search history.

(56) References Cited

U.S. PATENT DOCUMENTS

2004/0141217 A1   7/2004   Endo et al.
2004/0240013 A1*  12/2004  Tutt ..................... G03H 1/26
                                                359/30

(Continued)

FOREIGN PATENT DOCUMENTS

CN   106170729 A   11/2016
EP   1607983 A2   12/2005

(Continued)

*Primary Examiner* — Jennifer D. Carruth
(74) *Attorney, Agent, or Firm* — Bryan Cave Leighton Paisner LLP (57) ABSTRACT

A method of manufacturing a holographic optical element, including: irradiating a first surface of a photosensitive substrate with a first layer, and irradiating a second surface of the photosensitive substrate with a second laser. The light emitted by the first laser is spread in an irradiation direction and the light emitted by the second laser is collected in the irradiation direction to form a plurality of groups and a plurality of overlapping angles formed by a progress direction of the light emitted by the first laser and the progress direction of the light emitted by the second laser at a predetermined location of a photosensitive area, and each of the plurality of the overlapping angles are different from each other. A display device including the holographic optical element measured using this method.

8 Claims, 7 Drawing Sheets

(56) References Cited

U.S. PATENT DOCUMENTS

| | | | |
|---|---|---|---|
| 2014/0185115 A1 | 7/2014 | An et al. | |
| 2016/0033771 A1 | 2/2016 | Tremblay et al. | |
| 2016/0353092 A1 | 12/2016 | Bruder et al. | |
| 2021/0063747 A1* | 3/2021 | Saito | G03H 1/0272 |

FOREIGN PATENT DOCUMENTS

| | | |
|---|---|---|
| JP | 05281897 A | 10/1993 |
| JP | 2005189748 A | 7/2005 |
| JP | 2007079592 A | 3/2007 |
| JP | 2011075658 A | 4/2011 |
| JP | 2016517036 A | 6/2016 |
| JP | 2016128861 A | 7/2016 |
| JP | 2017037343 A | 2/2017 |
| KR | 10-20050102748 A | 10/2005 |
| KR | 10-20130022900 A | 3/2013 |
| KR | 10-2013-0094108 A | 8/2013 |
| KR | 1020140085114 A | 7/2014 |
| KR | 1020150136601 A | 12/2015 |
| KR | 10-20160094108 A | 8/2016 |
| KR | 10-20180014788 A | 2/2018 |
| KR | 10-20180051187 A | 5/2018 |
| WO | 2014156599 A1 | 10/2014 |

\* cited by examiner

MANUFACTURING METHOD OF HOLOGRAPHIC OPTICAL ELEMENT AND DISPLAY DEVICE INCLUDING HOLOGRAPHIC OPTICAL DEVICE MANUFACTURED THEREBY

CROSS-REFERENCE TO RELATED APPLICATIONS

This application is a U.S. national stage of international Application No. PCT/KR2019/011691 filed on Sep. 10, 2019, and claims priority to Korean Application No. 10-2018-0108650 filed on Sep. 12, 2018, the contents of which are incorporated in their entirety as if fully set forth herein.

TECHNICAL FIELD

The present invention relates to a manufacturing method of a holographic optical element and a display device including the holographic optical element manufactured thereby.

BACKGROUND

In recent years, with increasing interest in a display unit that implements augmented reality (AR), mixed reality (MR), or virtual reality (VR), there is a trend toward active research into the display unit that implements the augmented reality (AR), mixed reality (MR), or virtual reality (VR). The display unit that implements the augmented reality, the mixed reality, or the virtual reality includes a diffractive light guide plate using a diffraction phenomenon based on a vibrational property of light.

As the diffractive light guide, a light guide including a plurality of diffraction optical elements having a plurality of grid line patterns and a light guide including a holographic optical element as a photosensitive material in which an interference pattern is recorded are primarily used.

Meanwhile, in the case of the light guide including the diffraction optical element, color separation efficiency is low, and as a result, image crosstalk may occur. Further, in the case of the light guide including the diffraction optical element or the transmission type holographic optical element, overall optical loss may be significant.

On the contrary, the light guide including a reflection type holographic optical element has a disadvantage that the color separation efficiency is high, and although optical loss is smaller than that of the diffraction optical element/transmission type holographic optical element, an exit pupil for determining a size of an eye box is small.

The aforementioned background art is technical information which the inventor possesses for deriving embodiments of the present invention or acquired during a derivation process and may not particularly be known art available to the general public before application of the embodiments of the present invention.

SUMMARY

The present invention has been made in an effort to provide a method for manufacturing a reflection type holographic optical element forming a plurality of exit pupils and a display device including the holographic optical element manufactured thereby.

However, the objective to be achieved by the present invention is not limited to the aforementioned objective and other objectives, which are not mentioned above, will be apparent to a person having ordinary skill in the art from the following description.

An embodiment according to an aspect of the present invention provides a manufacturing method of the holographic optical element, including: irradiating a first laser in which light is spread in an irradiation direction on one surface of a photosensitive substrate; and irradiating a second laser in which light is collected in the irradiation direction on another surface of the photosensitive substrate, in which the first laser and the second laser may be irradiated so that a plurality of groups exists in which overlapping angles formed by a progress direction of the light from the first laser and the progress direction of the light from the second laser are different from each other at a predetermined location of a photosensitive area in which the light from the first laser and the light from the second laser cross on the photosensitive substrate.

An embodiment according to another aspect of the present invention provides a display device including: a lens unit including a holographic optical element manufactured by an embodiment according to another aspect of the present invention; and a light irradiation unit irradiating light which is spread in an irradiation direction to the holographic optical element, in which the light irradiation unit irradiates light which is spread at an angle which is the same as an angle at which light of a second laser is collected.

Even though light having a single wavelength is input into a reflection type holographic optical element manufactured by a manufacturing method of a holographic optical element according to an aspect of the present invention by using a projector/a light irradiation unit, holograms having different coherent characteristics at a predetermined location are recorded, and as a result, a plurality of different light reflection paths may be formed by reflection, thereby implementing a plurality of exit pupils.

DETAILED DESCRIPTION

An embodiment according to an aspect of the present invention provides a manufacturing method of the holographic optical element, including: irradiating a first laser in which light is spread in an irradiation direction on one surface of a photosensitive substrate; and irradiating a second laser in which light is collected in the irradiation direction on another surface of the photosensitive substrate, in which the first laser and the second laser may be irradiated so that a plurality of groups in which overlapping angles formed by a progress direction of the light from the first laser and the progress direction of the light from the second laser are different from each other at a predetermined location of a photosensitive area in which the light from the first laser and the light from the second laser cross on the photosensitive substrate.

In the embodiment, in the irradiating of the first laser, a second laser may be irradiated in which the irradiation directions are parallel to each other at a plurality of locations separated from each other, respectively.

In the embodiment, in the irradiating of the first laser, a plurality of first lasers in which the irradiation directions are different from each other may be irradiated, in the irradiating of the second laser, a plurality of second lasers in which the irradiation directions are different from each other may be irradiated, and a cross angle formed by the irradiation direction of any one first laser among the plurality of first lasers and the irradiation direction of any one second laser among the plurality of second lasers may be the same as the cross angle formed by the irradiation direction of any another first laser and the irradiation direction of any another second laser.

In the embodiment, the irradiating of the first laser and the irradiating of the second laser may be performed a plurality of numbers of times while the photosensitive substrate is rotated at a predetermined angle interval based on a predetermined horizontal center line.

An embodiment according to another aspect of the present invention provides a display device including: a lens unit including a holographic optical element manufactured by an embodiment according to an aspect of the present invention; and a light irradiation unit irradiating light which is spread in an irradiation direction to the holographic optical element, in which the light irradiation unit irradiates light which is spread at an angle which is the same as an angle at which light of a second laser is collected.

In the embodiment, the light irradiation unit may irradiate image light having a single wavelength.

MODE FOR INVENTION

The present invention will be apparent with reference to embodiments to be described below in detail together with the accompanying drawings. However, the present invention is not limited to the following exemplary embodiments but may be implemented in various different forms. The exemplary embodiments are provided only to make description of the present invention complete and to fully provide the scope of the present invention to a person having ordinary skill in the art to which the present invention pertains, and the present invention will be just defined by the appended claims. Meanwhile, it is also to be understood that the terminology used herein is for the purpose of describing embodiments only and is not intended to limit the present invention. In this specification, singular forms include even plural forms unless the context indicates otherwise. It is to be understood that the terms 'comprises' and/or 'comprising' used in this specification does not exclude presence or addition of one or more other components, steps, operations, and/or elements with respect to stated components, steps, operations, and/or elements. Terms including as first, second, and the like are used for describing various components, but the components are not limited by the terms. The terms are used only to discriminate one component from another component.

Hereinafter, the present invention will be described in more detail with reference to the drawings.

Figure 1A:
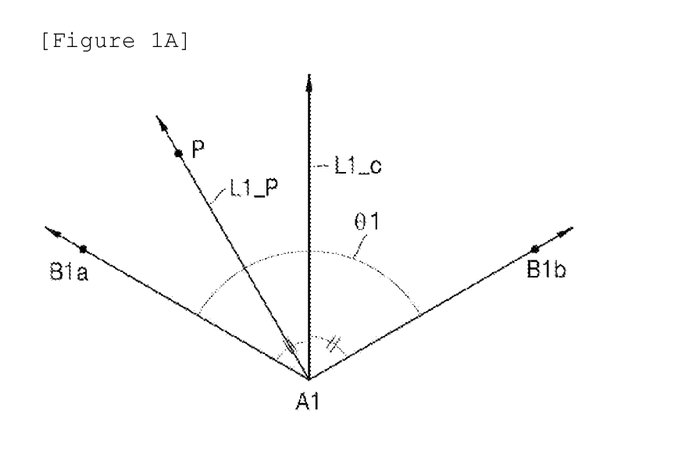
FIGS. 1A and 1B are schematic illustrations of a relationship between an irradiation direction of each of a first laser and a second laser and a progress direction of light of each of the first laser and the second laser at a predetermined location.
Figure 1B:
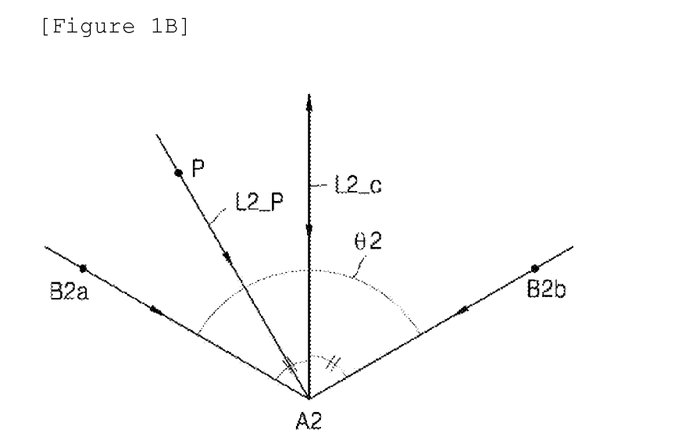
Figure 2A:
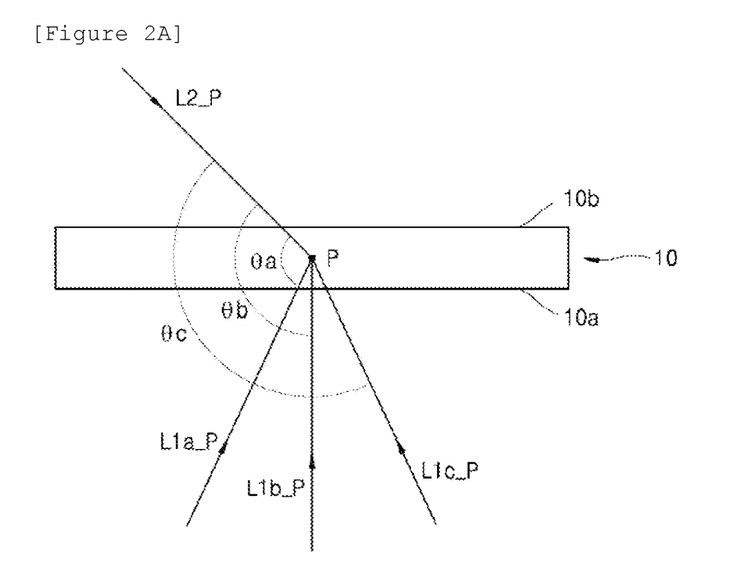
FIGS. 2A and 2B are schematic illustrations of a plurality of groups, in which overlapping angles between a progress direction of light of a first laser and the progress direction of light from a second laser at a predetermined location of a photosensitive area are different from each other in a manufacturing method of a holographic optical element according to an aspect of the present invention.
Figure 2B:
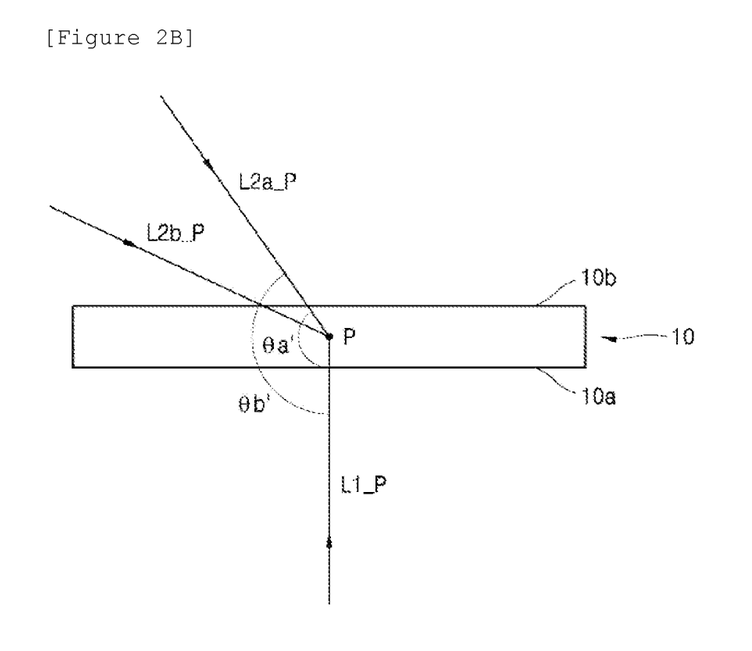

FIG. 1 is a schematic illustration of a relationship between an irradiation direction of each of a first laser and a second laser and a progress direction of light of each of the first laser and the second laser at a predetermined location and FIG. 2 is a schematic illustration of a plurality of groups, in which overlapping angles between a progress direction of light of a first laser and the progress direction of light from a second laser at a predetermined location of a photosensitive area are different from each other in a manufacturing method of a holographic optical element according to an aspect of the present invention.

In the manufacturing method of the holographic optical element according to an aspect of the present invention, which is used for manufacturing the holographic optical element used for the display device implementing augmented reality, a hologram is recorded by irradiating two lasers which are coherent to each other on a photosensitive substrate to manufacture the holographic optical element.

Meanwhile, the photosensitive substrate may be a film type including a photosensitive layer. Further, the photosensitive layer may include a photosensitive material. In a hologram related field, various types of photosensitive materials are known, which may be used to replicate the holographic optical element and the material may be used in the present invention without a limit. For example, as the photosensitive material, a photopolymer, photoresist, silver halide emulsion, dichromated gelatin, photographic emulsion, photothermoplastic, or photorefractive material may be used. The photosensitive substrate may be a non-anisotropic optically transparent film, for example, a substrate including triacetyl cellulose (TAC), polyethylene (PE), polycarbonate (PC), polypropylene (PP), polyamide (PA), or polyethylene terephthalate (PET), but is not particularly limited.

It is known that a reflection-type holographic optical element to be manufactured through the manufacturing method according to an aspect of the present invention may be manufactured by irradiating an object wave onto one surface of a photosensitive substrate and irradiating a reference wave onto another surface of the photosensitive substrate opposite to the one surface. The manufacturing method of the holographic optical element according to an aspect of the present invention may include: irradiating a first laser in which light is spread in an irradiation direction on one surface of a photosensitive substrate; and irradiating a second laser in which light is collected in the irradiation direction on another surface of the photosensitive substrate, in which the first laser and the second laser may be irradiated so that a plurality of groups exists in which overlapping angles formed by a progress direction of the light from the first laser and the progress direction of the light from the second laser are different from each other at a predetermined location of a photosensitive area in which the light from the first laser and the light from the second laser cross on the photosensitive substrate. Here, the photosensitive substrate may be irradiated by the first laser and the second laser simultaneously to create coherence. As a result, a plurality of holograms in which coherent characteristics are different from each other may be recorded at a predetermined location of the photosensitive substrate. Even though light having a single wavelength is input into a reflection type holographic optical element manufactured by a manufacturing method according to an aspect of the present invention by using a projector/light irradiation unit, holograms having different coherent characteristics at a predetermined location are recorded, and as a result, a plurality of different light reflection paths may be formed by reflection, thereby implementing a plurality of exit pupils.

Here, the light from the first laser and the second laser may have the same single wavelength.

First, a relationship between an irradiation direction of each of a first laser and a second laser and a progress direction of light from each of the first laser and the second laser at a predetermined location is illustrated in FIGS. 1A and 1B.

A first laser is a laser in which light is spread in the irradiation direction. As illustrated in FIG. 1A, the irradiation direction of the first laser may mean a direction in which a line L1_c bisecting an angle θ1 formed by both outermost points B1a and B1b of light which is spread based on a cross section around a point A1 at which the light is collected extends in a direction in which the light is gradually spread. The progress direction of the light from the first laser at a predetermined location P may mean a direction in which a line L1_P linking the point A1 at which the light is collected and the predetermined location P extends in the direction in which the light is gradually spread.

A second laser is a laser in which the light is collected in the irradiation direction. As illustrated in FIG. 1B, the irradiation direction of the second laser may mean a direction in which a line L2_c bisecting an angle θ2 formed by both outermost points B2a and B2b of light which is spread based on a cross section around a point A2 at which the light is collected extends in a direction in which the light is gradually collected. The progress direction of the light from the second laser at a predetermined location P may mean a direction in which a line L2_P linking the point A2 at which the light is collected and the predetermined location P extends in the direction in which the light is gradually collected.

As illustrated in FIGS. 2A and 2B, a plurality of groups exists, in which overlapping angles between a progress direction of light from a first laser and the progress direction of light from a second laser at a predetermined location of a photosensitive area are different from each other in a manufacturing method of a holographic optical element according to an aspect of the present invention.

For example, as illustrated in FIG. 2A, the first laser may be irradiated onto one surface 10a of a photosensitive substrate 10 and here, it is preferable that the first laser is irradiated multiple times simultaneously or separately so that the progress directions are different from each other and reaches the predetermined location P of the photosensitive substrate 10 simultaneously or separately. Another surface 10b of the photosensitive substrate 10 may be irradiated by the second laser. In this case, since the progress direction of the light from the second laser reaching the predetermined location P of the photosensitive substrate 10 may be defined as a single progress direction L2_P and the progress direction of the light from the first laser reaching the predetermined location P of the photosensitive substrate 10 may be defined as a plurality of progress directions L1a_P, L1b_P, and L1c_P, a plurality of groups L1a_P to L2_P, L1b_P to L2_P, and L1c_P to L2_P may consequently exist in which overlapping angles θa, θb, and θc formed by the progress direction of the light from the first laser and the progress direction of the light from the second laser at the predetermined location P of the photosensitive area in which the first laser and the second laser interfere with each other are different from each other.

As another example, as illustrated in FIG. 2B, one surface 10a of the photosensitive substrate 10 may be irradiated with the first laser. Another surface 10b of the photosensitive substrate 10 may be irradiated by the second laser and here, the second laser may be irradiated multiple times simultaneously or separately so that a plurality of light in which the progress direction are different from each other reaches the predetermined location P of the photosensitive substrate 10 simultaneously or separately. In this case, since the progress direction of the light from the first laser reaching the predetermined location P of the photosensitive substrate 10 may be defined as a single progress direction L1_P and the progress direction of the light from the second laser reaching the predetermined location P of the photosensitive substrate 10 may be defined as a plurality of progress directions L2a_P, and L2b_P, a plurality of groups L1_P to L2a_P and L1_P to L2b_P may consequently exist in which overlapping angles θa' and θb' formed by the progress direction of the light from the first laser and the progress direction of the light from the second laser at the predetermined location P of the photosensitive area in which the first laser and the second laser interfere with each other are different from each other.

Figure 3:
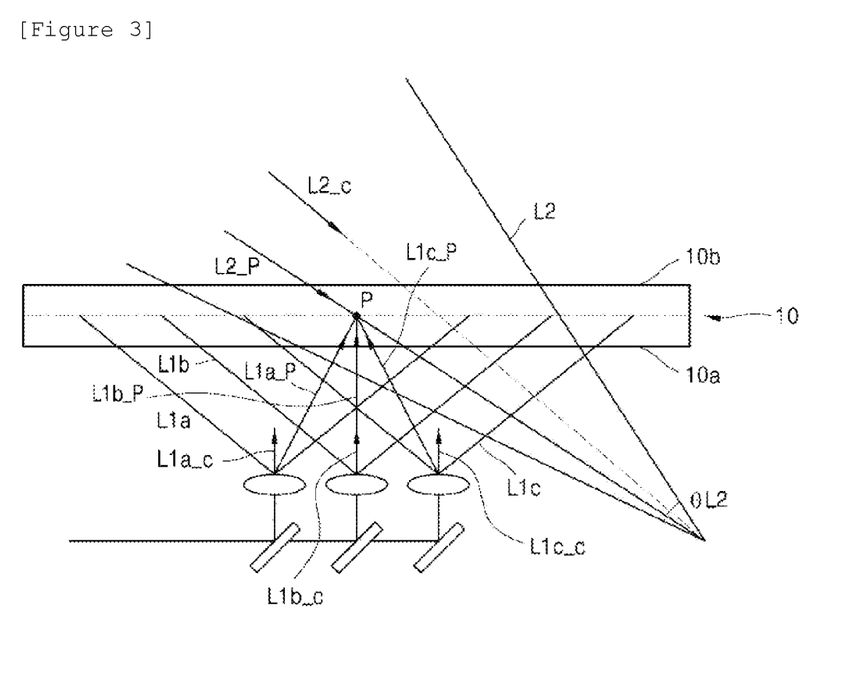
FIG. 3 is a schematic illustration of an irradiation method of a first laser and a second laser in the manufacturing method of the holographic optical element according to an aspect of the present invention.

FIG. 3 is a schematic illustration of an example of an irradiation method of a first laser and a second laser in the manufacturing method of the holographic optical element according to an aspect of the present invention.

As illustrated in FIG. 3, irradiation directions L1a_c, L1b_c, and L1c_c of a plurality of first lasers L1a, L1b and L1c are parallel to each other at a plurality of locations which are spaced apart from each other in a width direction (a horizontal direction based on FIG. 3) of the photosensitive substrate 10. In this case, the photosensitive substrate 10 may be irradiated by a plurality of first lasers L1a, L1b, and L1c simultaneously or separately. However, the second laser may be irradiated simultaneously with each of the first lasers L1a, L1b, and L1c to record a hologram using coherence. In this case, a plurality of light L1a_P, L1b_P, L1c_P in which the progress directions of the plurality of first lasers L1a, L1b, and L1c are different from each other may reach the predetermined location P of the photosensitive area and a plurality of groups L1a_P to L2_P, L1b_P to L2_P, and L1c_P to L2_P may exist in which overlapping angles formed by the progress direction of the light from the first lasers L1a, L1b, and L1c and the progress direction of the light from the second laser at the predetermined location P in a relationship with the light L2_P reaching the predetermined location P by the second laser L2 are different from each other.

Figure 4A:
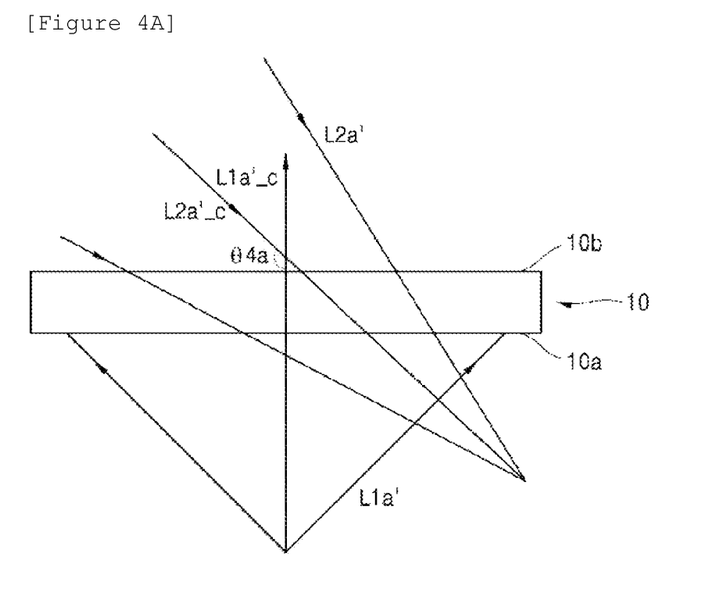
FIGS. 4A and 4B are schematic illustration of another example of the irradiation method of the first laser and the second laser in the manufacturing method of the holographic optical element according to an aspect of the present invention.
Figure 4B:
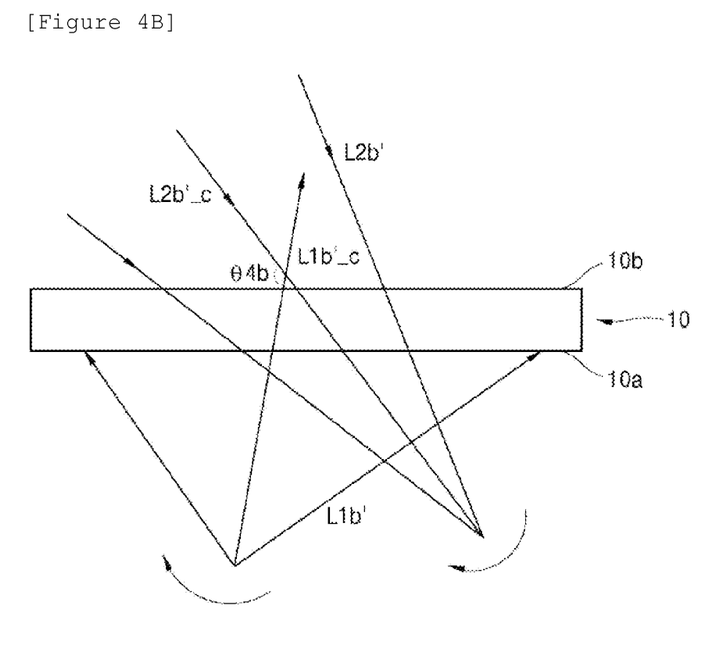

FIGS. 4A and 4B are schematic illustrations of another example of the irradiation method of the first laser and the second laser in the manufacturing method of the holographic optical element according to an aspect of the present invention.

On surface 10a of a photosensitive substrate 10 may be irradiated by a plurality of first lasers in which the progress directions of the plurality of first lasers are different from each other and the surface 10a of the photosensitive substrate 10 may also be irradiated by a plurality of second lasers in which the progress directions of the plurality of second lasers are different from each other. As illustrated in FIGS. 4A and 4B, first lasers L1a' and L1b' are irradiated in different irradiation directions L1a'_c and L1b'_c and second lasers L2a' and L2b' are also irradiated in different irradiation direction L2a'_c and L2b'_c. Meanwhile, a cross angle $\theta_{4a}$ formed by irradiation directions L1a'_c and L2a'_c of any one first laser L1a' of the plurality of first lasers L1a' and L1b' and any one second laser L2a' of the plurality of second lasers may be the same as a cross angle $\theta_{4b}$ formed by the irradiation directions L1b'_c and L2b'_c of any another first laser L1b' and any another second laser L2b'. Even though the photosensitive substrate 10 may be irradiated by the first laser and the second laser by such a method, a plurality of groups may exist in which the overlapping angles formed by the progress direction of the light from the first laser and the progress direction of the light from the second laser are different from each other at the predetermined location P of the photosensitive area on the photosensitive substrate 10.

Figure 5:
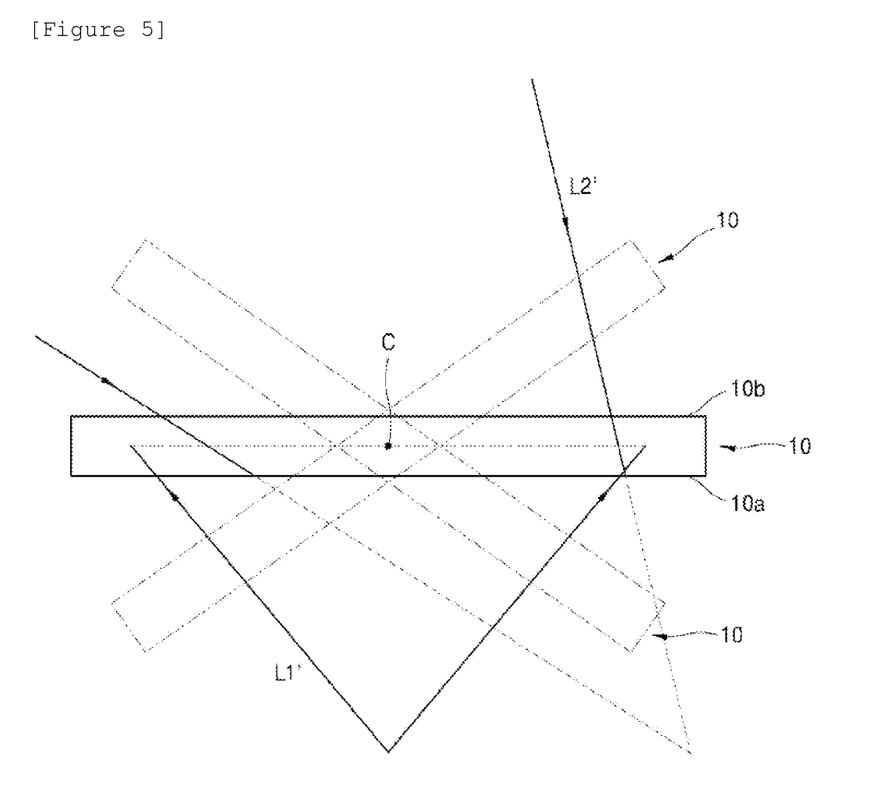
FIG. 5 is a schematic illustration of yet another example of the irradiation method of the first laser and the second laser in the manufacturing method of the holographic optical element according to an aspect of the present invention.

FIG. 5 is a schematic illustration of yet another example of the irradiation method of the first laser and the second laser in the manufacturing method of the holographic optical element according to an aspect of the present invention.

The photosensitive substrate 10 may be irradiated by the first laser and the second laser multiple times while the photosensitive substrate 10 is rotated at a predetermined angle around a predetermined horizontal center line C (a direction vertical to a plane of FIG. 5). Even though the photosensitive substrate 10 is irradiated with the first laser L1' and the second laser L2' by such a method, a plurality of groups may exist in which the overlapping angles formed by the progress direction of the light from the first laser and the progress direction of the light from the second laser are different from each other at the predetermined location P of the photosensitive area on the photosensitive substrate 10.

Figure 6:
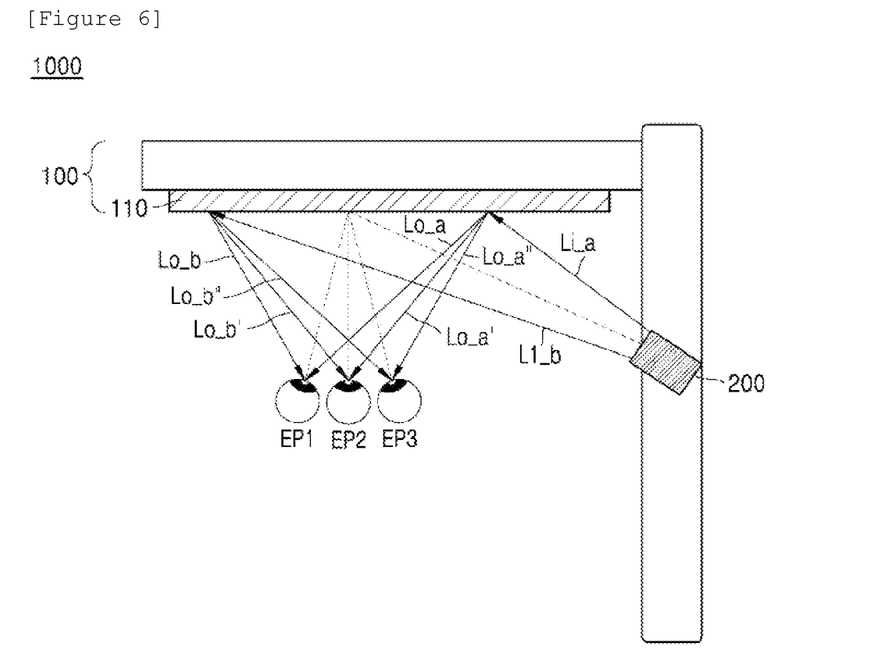
FIG. 6 is a schematic illustration of one example of a display device according to another aspect of the present invention.

FIG. 6 is a schematic illustration of one example of a display device according to another aspect of the present invention.

The display device 1000 according to another aspect of the present invention may include a lens unit 100 including a holographic optical element 110 manufactured by a manufacturing method of a holographic optical element according to an aspect of the present invention and a light irradiation unit 200 irradiating light Li_a and Li_b which is spread in the irradiation direction to the holographic optical element 110.

The lens unit 100 allows external light of a natural system to be transmitted by arranging the holographic optical element 110 on one surface of a transparent glass substrate or a polymer resin substrate to allow a display user to recognize an object, a background, etc., of the natural system as it is and display light input through the light irradiation unit 200 as an imaginary image which is reflected by the reflection type holographic optical element 110 and floated on an object, a background, etc., of a natural system recognized by a user.

The light irradiation unit 200 may irradiate the holographic optical element 110 with light Li_a and Li_b which is spread at the substantially same angle as an angle $\theta_{L2}$ at which the light of the second laser used at the time of manufacturing the holographic optical element according to an aspect of the present invention is collected.

The light irradiation unit 200 may irradiate the holographic optical element 110 with light Li_a and Li_b having a single wavelength. Specifically, the light irradiation unit 200 may irradiate the holographic optical element 110 with light having the same single wavelength as the second laser used at the time of manufacturing the holographic optical element according to an aspect of the present invention.

In the display device 1000 according to the embodiment of the present invention, since holograms in which coherent characteristics are different are recorded at a predetermined location P of the holographic optical element 110, a plurality of different light reflection paths Lo_a, Lo_a'; Lo_b, and Lo_b' may be formed by reflection even though the holographic optical element is irradiated with light having a single wavelength is input to the lens unit 100, thereby implementing a plurality of exit pupils EP1, EP2, and EP3. As multiple exit pupils are generated by the light, the eye box may be larger and in the case of the display device 1000, even though the location of an actual pupil of the user of the lens unit 100 varies for each user, there is an advantage in that the display device 1000 may be used according to users having various body conditions based on the plurality of exit pupils that are generated. Further, in implementing the plurality of exit pupils, the display device 1000 has an advantage in that a plurality of lasers irradiating light having different wavelengths need not be used.

Figure 7:
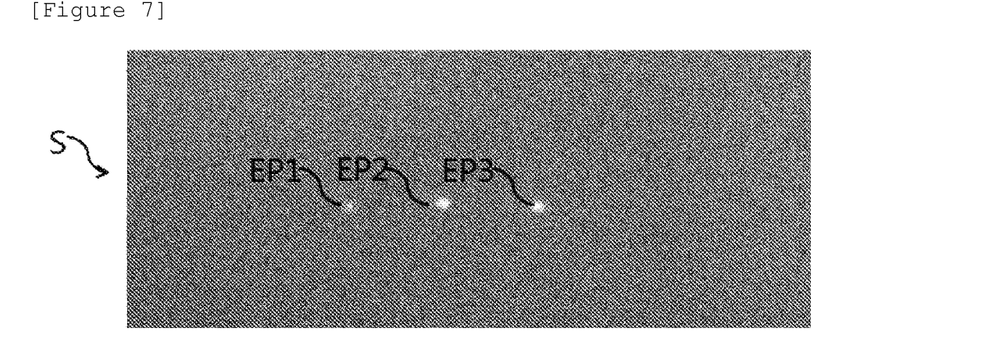
FIG. 7 is an image of the plurality of exit pupils formed by irradiating laser light having a specific wavelength to a lens unit including a holographic optical element manufactured by a first laser and a second laser having specific wavelengths.

FIG. 7 is an image of the plurality of exit pupils formed by laser light having a specific wavelength irradiated on a lens unit including a holographic optical element manufactured by a first laser and a second laser having specific wavelengths.

Specifically, as shown in FIG. 7, a holographic optical element manufactured by using a first laser and a second laser having a wavelength of 532 nm, and irradiating the lens unit including the holographic optical element with the first and second lasers in a light irradiation unit having a screen S at a specific distance from the lens unit results in the formation of three exit pupils EP1, EP2, and EP2 on the screen.

Although the present invention has been described in connection with the preferred embodiments mentioned above, various modifications or variations can be made without departing from the spirit and the scope of the present invention. Accordingly, the modifications or variations will be included in the scope of the appended claims if the present invention belongs to the spirit of the present invention.

The invention claimed is:

1. A method of manufacturing a holographic optical element, comprising:
   irradiating a first surface of a photosensitive substrate with a first laser, wherein light emitted by the first laser is spread in an irradiation direction; and
   irradiating a second surface of the photosensitive substrate with a second laser, wherein light emitted by the second laser is collected in the irradiation direction,
   wherein the first and second surfaces of the photosensitive substrate are irradiated with the first laser and the second laser to form a plurality of groups,
   wherein a plurality of overlapping angles are formed by a progress direction of the light emitted by the first laser and the progress direction of the light emitted by the second laser at a predetermined location of a photosensitive area of the photosensitive substrate at which the light emitted by the first laser and the light emitted by the second laser cross, wherein each of the plurality of the overlapping angles are different from each other, and wherein in the irradiating of the first surface of the photosensitive substrate with the first laser, a plurality of irradiation directions of the first laser are parallel to each other at a plurality of locations separated from each other, respectively.

2. The manufacturing method of a holographic optical element of claim 1, wherein the irradiating of the first surface of the photosensitive substrate with the first laser and the irradiating of the second surface of the photosensitive substrate with the second laser are performed a plurality of times while the photosensitive substrate is rotated at a predetermined angle based on a predetermined horizontal center line.

3. A display device comprising:
a lens unit including a holographic optical element manufactured by the method of claim 1; and
a light irradiation unit irradiating the holographic optical element with light spread in an irradiation direction,
wherein the light spread in an irradiation direction is spread at an angle which is the same as an angle at which light from a second laser is collected.

4. The display device of claim 3, wherein the light irradiation unit emits light having a single wavelength.

5. A method of manufacturing a holographic optical element, comprising:
irradiating a first surface of a photosensitive substrate with a first laser, wherein light emitted by the first laser is spread in an irradiation direction; and
irradiating a second surface of the photosensitive substrate with a second laser, wherein light emitted by the second laser is collected in the irradiation direction,
wherein the first and second surfaces of the photosensitive substrate are irradiated with the first laser and the second laser to form a plurality of groups,
wherein a plurality of overlapping angles are formed by a progress direction of the light emitted by the first laser and the progress direction of the light emitted by the second laser at a predetermined location of a photosensitive area of the photosensitive substrate at which the light emitted by the first laser and the light emitted by the second laser cross, wherein each of the plurality of the overlapping angles are different from each other, wherein in the irradiating of the first surface of the photosensitive substrate by the first laser, the photosensitive substrate is irradiated with a plurality of first lasers in which a plurality of irradiation directions are different from each other, wherein in the irradiating of the second surface of the photosensitive substrate with the second laser, the photosensitive substrate is irradiated with a plurality of second lasers in which the irradiation directions are different from each other, and wherein an overlapping angle formed by the irradiation direction of any one first laser among the plurality of first lasers and the irradiation direction of any one second laser among the plurality of second lasers is the same as the overlapping angle formed by the irradiation direction of any other first laser among the plurality of first lasers and the irradiation direction of any other second laser among the plurality of second lasers.

6. The manufacturing method of a holographic optical element of claim 5, wherein the irradiating of the first surface of the photosensitive substrate with the first laser and the irradiating of the second surface of the photosensitive substrate with the second laser are performed a plurality of times while the photosensitive substrate is rotated at a predetermined angle based on a predetermined horizontal center line.

7. A display device comprising:
a lens unit including a holographic optical element manufactured by the method of claim 5; and
a light irradiation unit irradiating the holographic optical element with light spread in an irradiation direction,
wherein the light spread in an irradiation direction is spread at an angle which is the same as an angle at which light from a second laser is collected.

8. The display device of claim 7, wherein the light irradiation unit emits light having a single wavelength.

* * * * *